COLOR TELEVISION BANDPASS NETWORK UTILIZING A CANCELLATION TRAP

Filed April 19, 1954

INVENTOR.

Morris D. Nelson

BY [signature]

ATTORNEY

United States Patent Office 3,029,400
Patented Apr. 10, 1962

3,029,400
COLOR TELEVISION BANDPASS NETWORK UTILIZING A CANCELLATION TRAP
Morris D. Nelson, Bronx, N.Y., assignor to Radio Corporation of America, a corporation of Delaware
Filed Apr. 19, 1954, Ser. No. 424,004
6 Claims. (Cl. 333—77)

This invention relates generally to signal transfer apparatus and more particularly to signal transfer apparatus of the bandpass type suitable for such uses as in intermediate frequency amplifiers of monochrome and color television receivers, and to bandpass networks and rejection or trap circuits for use in such amplifiers.

In intermediate frequency amplifiers for monochrome television receivers, it is conventional to provide trap circuits adapted to attenuate the accompanying sound carrier relative to the picture carrier. For example, in monochrome receivers incorporating the so-called intercarrier sound system, optimum operating conditions generally require a ratio between picture carrier and sound carrier amplitudes at the output of the IF amplifier of the order of 15 to 1. Additional traps in the receiver's video circuits may be provided and tuned to the intercarrier beat to provide the further attenuation of sound components in the video channel necessary to eleminate sound interference with picture. In color receivers, howevery, the proper handling of sound components in IF and video circuits poses a more complicated problem. A color television composite picture signal in accordance with present FCC standards includes a color subcarrier of approximately 3.58 mc. Chroma and hue information is conveyed by sidebands of the color subcarrier, one sideband necessarily extending close to the accompanying sound components in the frequency spectrum of a received color television signal. If attenuation of sound carrier relative to picture carrier in the color receiver's IF amplifier is only of the aforesaid order of 15 to 1, an objectionable beat of approximately 920 kc. (the difference between the 3.58 color subcarrier and the 4.5 intercarrier beat) appears with significant amplitude in the video output of the second detector. An interfering signal of this frequency cannot be conveniently trapped out in the subsequent video circuits. To eliminate the presence of this beat between color subcarrier and sound in the video channel, it is imperative that the sound carrier be essentially completely removed from the IF signal before its application to the video second detector, a non-linear circuit element wherein such a beat will otherwise be produced.

It is thus apparent that it is necessary to provide a color receiver IF amplifier with rejection networks or traps which strongly attenuate the sound carrier. From the point of view of avoidance of color crosstalk, it is desirable that the rejection band of such trap circuits be as narrow as possible so as to avoid excessively differential attenuation of the upper and lower sidebands of the color subcarrier. Such sharp rejection is also desirable to avoid unduly limiting picture resultion. However, with tray circuits of the character heretofore employed, the achievement of such a narrow rejection band, i.e. the sharp notching of the response characteristic of the IF amplifier, is accompanied by highly undesirable phase shifts of signal components lying adjacent to the notch in the response spectrum. A dilemma is thus posed, steep-skirted narrow band notching introducing a non-linear phase characteristic which results in erroneous color information, and shallow-skirted wide band notching introducing color crosstalk due to unequal amplitudes of response to corresponding upper and lower sidebands of the color subcarrier and unduly limiting the effective resolution of the color image reproduction. The present invention is directed toward signal transfer apparatus of a novel character which may be utilized in the IF channel of a color television as a solution to the serious problem discussed above.

In accordance with the present invention bandpass circuits are provided with novel traps operating on a cancellation principle as opposed to the absorption principle of the conventionally employed trap circuit. These novel trap circuits may provide the sharply defined deep response characteristic notches desired, as above indicated, for sound rejection in color IF amplifiers, without introducing the objectionably non-linear phase characteristic normally accompanying such notching by conventional trap circuits. In accordance with a particular embodiment of the present invention a pair of mutually coupled substantially similar windings, which may, for example, be the respective windings of a bifilar wound coil, are connected in series between the output terminal of a stage and the input terminal of the succeeding stage of a bandpass amplifier. The windings are related such that signals conveyed from the output terminal to the input terminal via transformer action of the mutually coupled windings undergo a phase reversal. The point of serial connection between the windings is connected to a point of reference potential via a parallel resonant circuit, the connection between the windings and said parallel resonant circuit being at a point on the inductance element of the latter. This parallel resonant circuit is sharply tuned to a frequency lying in the desired narrow rejection band. The mutually coupled windings resonate with their shunt capacities (distributed and otherwise) at a frequency in the middle of a desired passband, being broadly tuned thereto.

The cancellation principle of operation may be described briefly as follows: The impedance characteristics of the sharply tuned parallel resonant circuit and the broadly tuned windings may be chosen so that the impedance of the former matches the impedance of each winding at a frequency $f_1$, the center frequency of the desired rejection band. The rejection frequency $f_1$ may, for example, be at corresponding half power points on the impedance characteristics of the components. However, the relative location of $f_1$ on the respective resonance curves need not be identical, so long as the impedances essentially correspond in amplitude and sign of reactance at $f_1$. Thus, at $f_1$ the input voltage will divide between the input winding and the sharply tuned trap circuit. The respective divided voltages will correspond in phase as well as amplitude. Due to the aforementioned phase reversal in the transformer action of the mutually coupled windings, however, the voltage across the output winding will be equal to but opposite in phase to the input voltage component appearing across the input winding of the mutually coupled pair. Thus, the net output voltage at the output terminal is essentially zero since the output voltage component across the output winding will be effectively cancelled out by the equal but oppositely phased output voltage component appearing across the trap circuit.

At a frequency $f_2$ located at a corresponding point on the opposite side of the resonance curve of the sharply tuned parallel resonant circuit, the impedances of the input winding and the sharply tuned parallel resonant circuit and again substantially match in amplitude but the reactance component will, however, be opposite in sign. At this frequency the phase reversed voltage appearing across the output winding will thus be approximately 90° rather than 180° out of phase with the voltage across the trap circuit, and will provide a resultant output voltage essentially corresponding to the input voltage in amplitude. Attenuation ratios of 100 to 1 may be readily achieved within $f_1$–$f_2$ spacing (i.e. a spacing between the rejection center frequency and the nearest frequency of essentially full amplitude response) of the order of only 200 kc. A significant advantage of the present invention resides in the fact that such a sharp rejection notch may be inserted in the bandpass response without introducing undesirable phase shifts of signal frequencies adjacent to the notch. It may be observed that the described circuit is effectively a non-minimum phase shift network whereby such results are not incompatible with accepted minimum phase-shift filter theory. It may also be observed that since the described circuit is operated at high impedance, the stage gain may be the same as that of conventional bandpass stages. Thus, it is a primary object of the present invention to provide novel and improved signal transfer apparatus of a type suitable for use in television receiver IF channels.

It is a further object of the present invention to provide a novel and improved trap circuit for television receiver IF amplifiers.

It is an additional object of the present invention to provide a novel and improved color television receiver IF amplifier.

It is also an object of the present invention to provide a novel and improved means for sharply notching the response characteristic of a bandpass network without introducing undesirable phase shifts.

It is a further object of the present invention to provide a novel and improved trap circuit for rejecting the accompanying sound carrier in a color television receiver IF channel without unduly limiting resolution, without introducing color crosstalk, and without introducing significant phase distortion of signal components adjacent to the accompanying sound carrier.

Other objects and advantages of the present invention will be readily apparent to those skilled in the art upon a reading of the following detailed description and an inspection of the accompanying drawings in which:

FIGURE 1 illustrates schematically bandpass and trap circuitry in accordance with an embodiment of the present invention.

FIGURE 1*a* illustrates a particular form which apparatus of FIGURE 1 may take in accordance with a particular embodiment of the present invention.

FIGURE 1*b* illustrates schematically a modification of the circuits of FIGURE 1 in accordance with a further embodiment of the present invention.

FIGURE 5 illustrates graphically vector diagrams which also aid in explanation of such principles.

Figures 1, 1A, 1B, 2, 3, 4, 5A, 5B:
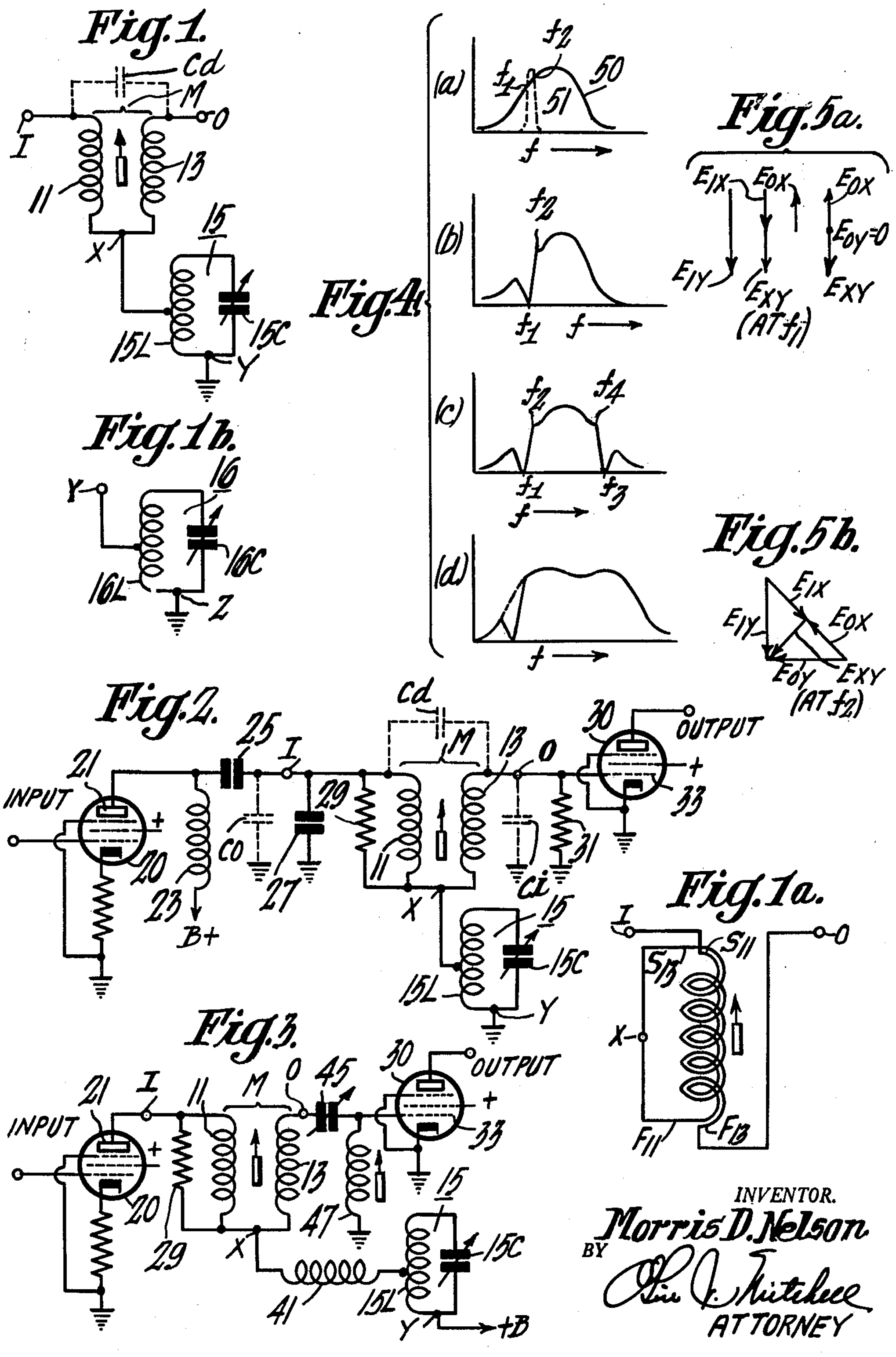
FIGURE 2 illustrates schematically application of the principles of the circuits of FIGURE 1 to a bandpass amplifier in accordance with one form of the present invention.
FIGURE 3 illustrates schematically a similar application of said principles in accordance with another form of the present invention.
FIGURE 4 illustrates graphically impedance and response characteristics which aid in explanation of the principles of the present invention embodied in the various forms illustrated in the preceding figures.

Referring first to FIGURE 1 for an understanding of the basic concepts of the present invention, it is noted that there is schematically illustrated a novel circuit coupling an input terminal "I" to an output terminal "O." A point "Y" in the novel circuit is at a reference potential (i.e. ground in the illustrative embodiment), and may be considered as a terminal common to both input and output. The illustrated network is a combination of passive circuit elements which are intended to provide a bandpass characteristic, including a sharp rejection notch at some predetermined frequency, for signals passing from the input terminals to the output terminals. How such a characteristic is achieved shall be explained after a consideration of the components and component characteristics of the novel circuit.

A pair of mutually coupled windings, 11 and 13, are effectively connected in series between the input terminal "I" and the output terminal "O." Point "X," the common point of connection of the windings 11 and 13 is connected to a point on the inductance element 15L of a parallel resonant circuit 15. One end of the parallel resonant circuit (i.e. point "Y") is connected to the common ground terminal, as previously indicated. The windings 11 and 13 resonate with such capacities as shunt them (e.g. the distributed capacities $C_d$ of the windings, illustrated in dotted lines in FIGURE 1) at a frequency in the center of the desired passband, and are broadly tuned relative to the sharp tuning of the resonant circuit 15 to a frequency lying in the desired narrow rejection band.

A pair of impedance characteristics or resonance curves are illustrated by the curves 50 and 51 of FIGURE 4*a*. Curve 50 illustrates the general shape of the resonance curve for the broadly tuned coupled windings combination, but for purposes of comparison with curve 51 in the present explanation is intended to represent the impedance characteristic of the primary or input winding 11 alone. (For purposes of the present explanation the secondary or output winding 13 may be assumed to have a substantially similar impedance characteristic.) Curve 51 represents the impedance characteristic of the sharply tuned resonant circuit 15. The curve of FIGURE 4*b* illustrates the frequency response characteristic to which the illustrated network subjects signals passing from input to output terminals when the circuit components possess the indicated impedance characteristics 50 and 51. It will be noted that the bandpass characteristic shown in FIGURE 4*b* includes a sharp rejection notch centered about a frequency of maximum attenuation, $f_1$. It is also noted that response rises sharply with increase in frequency above $f_1$, attaining nearly full amplitude response at a frequency $f_2$. Turning again to the impedance characteristics of FIGURE 4*a*, it is noted that the significant frequencies $f_1$ and $f_2$ coincide with respective ones of the two crossover points of the impedance characteristics 50 and 51.

The attainment of essentially complete attenuation at one of these characteristic crossover frequencies and essentially full amplitude response at the other will be more readily understood be considering the vector diagrams of FIGURES 5*a* and 5*b*, the former illustrating the vector relationship between various input and output voltage components at the rejection frequency $f_1$, and the latter illustrating such vector relationships at the rejection notch edge frequency $f_2$. As may be appreciated from a study of the network of FIGURE 1, an input voltage applied between input terminals "I" and "Y" may be considered as divided by the network into two input voltage components: $E_{IX}$, appearing across the input winding 11; and $E_{XY}$, the voltage developed across the resonant circuit 15 between the connecting points "X" and "Y." Similarly, the output voltage $E_{OY}$ appearing between output terminals "O" and "Y" may be considered as comprising two output voltage components: $E_{OX}$, the voltage appearing across the output winding 13; and the aforesaid resonant circuit voltage $E_{XY}$.

As indicated in FIGURE 5*a*, at $f_1$, the input voltage components $E_{IY}$ and $E_{XY}$ are equal in both amplitude and phase. The substantial equality in amplitude is achieved as indicated by FIGURE 4*a* by relating the impedance characteristics of the components such that a crossover occurs at this frequency. The substantial equality in phase is effected by providing that this crossover occurs at points on corresponding "sides" of the respective impedance characteristics. Exact matching in phase of the two input voltage components is virtually insured where the impedance characteristics are related such that the crossover occurs not only on corresponding sides of the respective characteristics but also at points of corresponding relative amplitude thereon (e.g. at corresponding half power—.707 maximum impedance—points of the respective characteristics). Also, as will be explained with reference to FIGURE 2, auxiliary components, such as a balancing resistor in shunt with the input winding, may be provided to more accurately relate the phasing of the input voltage components at $f_1$.

The output voltage component $E_{OX}$ appearing across output winding 13 corresponds in amplitude to the input winding voltage component $E_{IY}$, but is opposite in phase due to the aforesaid phase reversal in the transformer action of the mutually coupled windings. The net output voltage $E_{OY}$, which comprises the vector sum of the output voltage components $E_{OY}$ and $E_{XY}$, thus is seen to be essentially zero, since the vectors representative of these voltage components are equal in amplitude but directly opposite in direction. It may thus be appreciated that substantially complete attenuation of the desired rejection frequency $f_1$ is achieved by the illustrated network through the matching in amplitude but opposition in phase of output voltage components appearing across output winding 13 and resonant circuit 15.

However, at a slightly higher frequency $f_2$, its spacing from $f_1$ determined by the sharpness of tuning or Q of the resonant circuit 15, the cancellation effects which achieve full attenuation at $f_1$ no longer exist and essentially full amplitude signal transfer from input to output terminals occurs, as illustrated by the vector diagram of FIGURE 5*b*. At this frequency, the input voltage $E_{IY}$ is again divided into two substantially equal input voltage components $E_{IY}$ and $E_{XY}$, since another impedance characteristic crossover occurs. The input voltage components however are no longer in phase, but rather are approximately 90° out of phase, since the $f_2$ crossover occurs at points on opposite "sides" of the respective impedance characteristics, the reactance components of the respective impedances thus being opposite in sign. The output voltage component $E_{OY}$ appearing across the output winding 13 is again substantially equal in amplitude but opposite in phase to the input voltage component $E_{IX}$ appearing across the input winding 11. The output voltage component $E_{OX}$, however, is not opposite in phase to the output voltage component $E_{XY}$ appearing across the resonant circuit 15, but rather approximately 90° out of phase, as indicated by the vectors of FIGURE 5*b*. The vector summation of output voltage components $E_{OY}$ and $E_{XY}$ thus does not result in their mutual cancellation, but rather in the production of an output voltage $E_{OY}$, which though shifted in phase by approximately 90° is essentially equal in amplitude to the input voltage $E_{IY}$. Thus, at a frequency slightly removed toward the center of the desired passband from the desired rejection frequency, the frequency response characteristic of the illustrated network essentially returns to a normal passband characteristic.

While the preceding discussion has described the basic cancellation and reinforcement principles of operation of the novel bandpass-trap circuit combination of the present invention, various modifications, augmentations and substitutions which may be effected with respect to the network of FIGURE 1 in its application to particular apparatus and its use for particular purposes should now be considered. It should first be noted that, while in the description above the input and output windings 11 and 13 were considered as being substantially identical in nature and the explanation presumed a matching of resonant circuit 15 in impedance magnitude with each of these windings at the significant frequencies $f_1$ and $f_2$, this is a special case shown to simplify the explanation and is not mandatory in practice. It will be appreciated that to effect substantially complete attenuation at the rejection frequency $f_1$ it is not essential that the input voltage components $E_{IY}$ and $E_{XY}$ are equal so long as the nature and relationship between windings 11 and 13 are such as to result in an output voltage component $E_{OX}$ which matches and voltage component $E_{XY}$ in amplitude (but is opposite in phase). Thus, windings 11 and 13 may differ in size, so long as the relationship above obtains. It may also be noted that in practice of the present invention the use of a bifilar coil to provide the mutually coupled windings 11 and 13 has proved efficacious. In FIGURE 1*a*, the use of the windings of a bifilar wound coil as windings 11 and 13 in the network of FIGURE 1 is illustrated schematically, the connections being as indicated to effect the desired phase reversal of the transformer voltages, viz. the "start" $S_{11}$ of winding 11 being connected to input terminal "I," the "finish" $F_{13}$ of winding 13 being connected to output terminal "O," and the "finish" $F_{11}$ of winding 11 and the "start" $S_{13}$ of winding 13 being connected together at point "X." However, it should be apparent that satisfactory operation may be readily achieved where the mutual coupling is obtained in a manner other than through the use of a bifilar coil.

As indicated in FIGURE 1, adjustment of the tuning of the low Q windings 11 and 13 may be effected through use of a tuning slug. This is a particularly convenient manner of tuning adjustment where the windings 11 and 13 are in the form of a bifilar coil, as in FIGURE 1*a*. However, it should be appreciated that other means for effecting tuning adjustment may alternatively be employed. Similarly, while FIGURE 1 has indicated that tuning adjustments of the sharply tuned parallel resonant circuit 15 may be effected through adjustment of a variable capacitor 15C, a capacity element of the resonant circuit, other tuning means may be alternatively employed.

Where it is desired to attain a frequency response characteristic such as that represented by the curve illustrated in FIGURE 4*c*, i.e. where it is desired to provide another sharp rejection notch toward the opposite end of the desired passband, the circuit of FIGURE 1 may be modified as indicated in FIGURE 1*b*. Such modification involves the incorporation of another sharply tuned parallel resonant circuit 16 in the illustrated network. The bottom of the tuned circuit 15 (i.e. point "Y"), which was returned to ground in FIGURE 1, is rather connected to a point on the inductance element 16L of the additional resonant circuit 16, and the bottom of the latter resonant circuit (i.e. point Z) is returned to ground. In a manner similar to that described with respect to resonant circuit 15, the resonant circuit 16 may be adjusted to provide an impedance characteristic which crosses the impedance characteristic 50 at appropriate frequencies $f_3$ and $f_4$, such that the cancellation effects as exemplified by the vectors of FIGURE 5*a* obtain at $f_3$, while the non-attenuated signal transfer as exemplified by the vectors of FIGURE 5*b* obtains at $f_4$.

As previously noted in the general description of the present invention, the principles embodied in the network of FIGURE 1 are particularly applicable to use in bandpass amplifiers of the type employed for intermediate frequency amplification in television receivers. Also, as previously noted use of the invention is particularly advantageous in IF amplifiers for color television receivers, wherein substantially complete rejection of the accompanying sound carrier and its sidebands at intermediate frequencies is imperative.

There are three general types of intermediate frequency amplifiers, basically differentiated by the type of inter-stage coupling employed: the single-tuned, the double-tuned, and the stagger-tuned varieties. In the first type, one tuned circuit appears between stages, and the response curve has a round shape, substantially flat over the sideband region of the signal to be amplified. In the double-tuned type, two tuned circuits are inserted between stages, and the response curve has a double-humped or flat-top shape. In the stagger-tuned type, each stage has one tuned circuit, but successive stages are tuned to slightly different frequencies and the overall response curve approaches the flat-top form of the double-tuned type. FIGURE 2 illustrates use of a network of the type illustrated in FIGURE 1 as a portion of the interstage coupling of an IF amplifier which may be of the single-tuned, or more likely of the stagger-tuned type. FIGURE 3 illustrates the use of a network of the type illustrated in FIGURE 1 as a portion of the interstage coupling of an IF amplifier of the double-tuned type.

Referring more specifically to FIGURE 2, a pair of amplifiers 20 and 30 are illustrated as successive amplifying stages in an IF amplifier. Input signals, which may, for example, be derived from the output of a preceding stage of the IF amplifier, appear at the terminal labeled "input" and are applied to the control grid of the amplifier tube 20. The output electrode, anode 21, of the amplifier tube 20 is supplied with operating potential via its connection through an inductance 23 to a suitable source of B+ potential. The inductance 23 may comprise a radio frequency choke, and it may thus be assumed that the inductance value thereof is such as to have negligible influence on the response of the IF amplifier. The anode 21 is connected to the input terminal "I" of a bandpass network of the character illustrated in FIGURE 1 by means of a D.-C. blocking capacitor 25, which may be assumed to have such a capacity value as also to be unimportant in considering the response characteristic of the circuits under discussion. The bandpass network-trap combination coupled between input terminal "I," output terminal "O," and ground is similar to that illustrated in FIGURE 1, except for the addition of a resistor 29 shunting the input winding 11, and the addition of a capacitor 27 connected between input terminal "I" and ground. These additions do not actually alter the basic principles of operation previously described, but represent compensations or corrections which may be required in a practical circuit embodying such principles. Thus, the addition of resistance 29 in shunt with input winding 11 may be desirable where accurate matching of impedances at the rejection frequency is otherwise difficult to achieve. Similarly, under given conditions of distributed and other inherent capacities in a practical circuit, it may be desirable or requisite to provide additional capacity to ground to achieve a desired spacing of the rejection frequency from the center of the passband.

The output terminal "O" is directly connected to the control grid 33 of amplifier 30, a ground return for control grid 33 through a resistor 31 being provided. Output signals are derived from a terminal labeled "output" connected to the anode of amplifier tube 30. As may be appreciated from an analysis of the FIGURE 2 circuit, the frequency response characteristic to which signals passing from the "input" terminal to the "output" terminal are subject is determined essentially by the characteristic of the bandpass network-trap combination coupled between input terminal "I," output terminal "O" and ground. FIGURE 4*b* is thus representative of the response characteristic of the IF amplifier portion illustrated in FIGURE 2. This characteristic is typical for an amplifier using a single-tuned interstage coupling, and also typical of the characteristic for each of the several slightly differently tuned stages in an amplifier of the stagger-tuned type.

It is noted that in addition to the illustration of the distributed capacity $C_d$ of the mutually coupled windings 11 and 13 in dotted lines, FIGURE 2 also contains dotted line indications of the output capacity $C_o$ of the amplifier 20 and of the input capacity $C_i$ of the amplifier 30. Throughout the major portion of the passband when the impedance of resonant circuit 15 is relatively insignificant and point "X" is effectively at ground potential, the input and output windings 11 and 13 are effectively directly shunted by capacities $C_o$ and $C_i$, respectively. Thus, it must be recognized that these capacities in addition to $C_d$ and the added capacitor 27 have an effect on the location and shape of the resonance curve 50 of FIGURE 4*a* and the response characteristic of FIGURE 4*b*.

It may also be pertinent at this time to point out that the signal transfer from plate 21 to control grid 33 is at a relatively high impedance throughout the passband, whereby gain in the amplifying stages is not sacrificed.

It will be readily appreciated that various modifications in the circuit connections of the bandpass network-trap combination to appropriate elements of the IF amplifier may be made without altering the basic operating principles. Thus, for example, the D.-C. blocking capacitor 25 may be connected between the output terminal "O" and the control grid 33, instead of its illustrated placement between anode 21 and input terminal "I." Also, the bottom of resonant circuit 15 (i.e. point "Y") may be connected to a point of B+ potential instead of to a point of ground potential, and the choke 23 may be dispensed with, input winding 11 and inductance 15L providing the required D.-C. path between anode 21 and the B+ source.

In FIGURE 3, the aforesaid modification involving the shift of the blocking capacitor, deletion of choke 23, and connection of point "Y" to B+ is shown. However, in this embodiment the capacitor (45 in FIGURE 3) serves not only to block B+ from the grid of amplifier 30, but is adjustable and of a significant capacity value. The ground return for control grid 33 takes the form of a tunable inductance coil 47. By tuning of inductance 47 and its shunt capacity may be to approximately the same resonant frequency as that of the mutually coupled windings 11 and 13. Thus, in the passband, the interstage coupling effectively appears as a pair of parallel resonant circuits bridged by a critical coupling capacitor. By adjusting the value of capacitor 45 to vary the capacitive coupling between this pair of parallel resonant circuits a flat-top or double-humped response characteristic may be obtained. Such a response characteristic is typical of the aforesaid double-tuned type of IF amplifier. In the rejection band the network of FIGURE 3 will perform substantially as described in the discussion of FIGURE 1. In FIGURE 4*d*, the solid line curve illustrates the notched, slightly double-humped response characteristic which may be obtained from the network of FIGURE 3. The dotted line curve in FIGURE 4*d* illustrates how the response characteristic would appear in the absence of resonant circuit 15. It may be noted that the particular embodiment of FIGURE 3, in addition to including the balancing resistor 29 previously discussed, also includes an additional inductance in the connection between point "X" and the inductance element 15L of the sharply tuned resonant circuit 15. The provision of inductance 41, while not essential, serves to make the degree of calcellation at the rejection frequency more nearly complete and to make the tapping point on inductance 15L less critical.

The use of the critical coupling capacitor in the circuit shown in FIGURE 3 to obtain a bandpass characteristic of the type shown in FIGURE 4*d* is but one of several well-known techniques for such purposes. Thus, it will be appreciated that a similar bandpass characteristic may be achieved via such other expedients as the use of critical inductive coupling ("top" or "bottom"), or a critical transformer coupling between the tuned windings 11, 13 and the tuned coil 47.

It should also be pointed out that while in all of the embodiments discussed heretofore the mutually coupled windings 11 and 13 provided the low Q, broadly tuned circuit and the resonant circuit 15 provide the high Q, sharply tuned circuit requisite for operation in accordance with the principles of the invention, the roles of the respective circuits may be reversed to achieve somewhat similar results. That is, the mutually coupled windings 11, 13 may be the high Q circuit sharply tuned to a frequency in the rejection band (possessing the characteristic 51), while the resonant circuit 15 may be low Q circuit broadly tuned to the center frequency of the desired passband (possessing characteristic 50). The previously noted cancellation effects at $f_1$ and substantially non-attenuated signal transfer at $f_2$ will again be achieved by the network with such reversed functions.

A very important feature of all of the discussed embodiments of the present invention and their suggested modifications resides in the advantage that through their use a sharp and narrow rejection notch may be inserted in a bandpass characteristic without introducing a seriously non-linear phase characteristic. As previously pointed out this is particularly important in applications to intermediate frequency amplification of color television signals. The necessity of substantially complete attenuation of the accompanying sound carrier in a color receiver's IF amplifier being dictated by the alternative presence of an undesirable beat between sound carrier and color subcarrier in the video channel, it is preferable to make this sound IF rejection band as sharp and narrow as possible to avoid unduly limiting picture resolution and to avoid excessive attenuation of the upper sidebands of a color subcarrier relative to the lower sidebands. However, with rejection or trap circuits of the type heretofore employed, attempts to provide such a rejection prove troublesome since they result in the introduction of a very non-linear phase characteristic for signal frequencies in the vicinity of the narrow rejection band. In particular, the phase distortions of the color subcarrier sideband components falling in this range are generally so objectionable as to rule out such sharp sound IF rejection. As a result, a middle-of-the-road compromise between the sharp sound rejection desired for retention of maximum video information and the shallow, wide rejection required to maintain phase characteristic linearity was heretofore the only practical solution. The present invention, however, provides a much more satisfactory solution whereby such a compromise need not be made. Measurements taken with respect to the phase characteristics of IF amplifiers utilizing embodiments of the present invention have indicated that extremely narrow, steep-skirted rejection notches may be effected without introduction of serious non-linearity in the phase characteristic of the IF amplifier. As a specific example of the sharp rejection that may be achieved through the use of the present invention without introducing any significant phase distortion of color subcarrier sideband components, the circuits exemplified in FIGURES 2 and 3 have been employed in color television receiver IF amplifiers to obtain substantially complete attenuation of the 41.25 mc. sound carrier ($f_1$), with essentially non-distorted full amplitude signal transfer for IF signal frequencies above a frequency of 41.45 mc., an edge (i.e. $f_2$) of the rejection band thus being spaced only 200 kc. from the center rejection frequency $f_1$. While the features of the present invention are thus directly applicable to color television receiver IF amplifier purposes, it will be appreciated that it may be desirable to take advantage of such features in bandpass components of other apparatus where sharp rejection of some interfering frequency without introduction of phase distortion is desired for other purposes.

Having thus described my invention, what is claimed is:

1. In a color television receiver IF channel, the combination comprising a source of a composite IF signal including a color subcarrier and sideband components thereof and occupying a predetermined band of intermediate frequencies and an accompanying sound carrier at a frequency adjacent to an edge of said band, said color subcarrier being situated in said band such that said sideband components thereof extend to said edge of said band, a composite signal utilization device, and signal transfer apparatus coupled between said source and said utilization device, said source presenting a predetermined output capacity to said signal transfer apparatus, said signal utilization device presenting a predetermined input capacity to said signal transfer apparatus; said signal transfer apparatus comprising (A) a pair of mutually coupled windings, said windings having predetermined distributed capacities, (B) means for providing said signal transfer apparatus with a bandpass frequency response characteristic encompassing said band of intermediate frequencies, said bandpass characteristic providing means comprising means for connecting said pair of winding in series between said source and said signal utilization device, and means for relatively broadly tuning a resonant circuit formed by said pair of windings, said distributed capacities, said output capacity, and said input capacity to a frequency in the vicinity of the center of said band of intermediate frequencies, and (C) means for introducing a relatively steep rejection notch in the frequency response characteristic of said signal transfer apparatus, said rejection notch introducing means comprising a parallel resonant circuit including an inductance element shunted by a capacitance element, said parallel resonant circuit being relatively sharply tuned to an intermediate frequency in the immediate vicinity of said accompanying sound carrier, said parallel resonant circuit having a terminal connected to a point of signal reference potential, and means for connecting a point on said inductance element to the junction of said series connected pair of windings.

2. Apparatus in accordance with claim 1 wherein said source is subject to provide in addition to the desired composite IF signal an undesired signal comprising an adjacent channel picture carrier at a frequency adjacent to the other edge of said IF band and wherein said signal transfer apparatus also includes an additional parallel resonant circuit comprising a second inductance element shunted by a second capacitance element, at least a portion of said inductance element being included in the connection between said terminal of said first named parallel resonant circuit and said point of signal reference potential, said additional parallel resonant circuit being relatively sharply tuned to a frequency in the immediate vicinity of said adjacent channel picture carrier.

3. Apparatus in accordance with claim 1 also including a resistance connected in shunt with one of said pair of windings, the value of said resistance being chosen to effect maximum rejection of said accompanying sound carrier.

4. Apparatus in accordance with claim 3 wherein said means for connecting a point on said inductance element to said junction includes an inductance coil.

5. In a color television receiver IF channel, the combination comprising a source of a composite IF signal including a color subcarrier and sideband components thereof and occupying a predetermined band of intermediate frequencies and an accompanying sound carrier at a frequency adjacent to an edge of said band, said color subcarrier being situated in said band such that said sideband components thereof extend to said edge of said band, a composite signal utilization device, and signal transfer apparatus coupled between said source and said utilization device, said source presenting a predetermined output capacity to said signal transfer apparatus, said signal utilization device presenting a predetermined input capacity to said signal transfer apparatus; said signal transfer apparatus comprising (A) a pair of mutually coupled, bifilar wound windings, said windings having predetermined distributed capacities, (B) means for providing said signal transfer apparatus with a bandpass frequency response characteristic encompassing said band of intermediate frequencies, said bandpass characteristic providing means comprising means for connecting said pair of windings in series between said source and said signal utilization device, and means for relatively broadly tuning a resonant circuit formed by said pair of windings, said distributed capacities, said output capacity, and said input capacity to a frequency in the vicinity of the center of said band of intermediate frequencies, and (C) means for introducing a relatively steep rejection notch in the frequency response characteristic of said signal transfer apparatus, the frequency of said sound carrier falling within said notch, said rejection notch introducing means comprising a parallel resonant circuit including an inductance element shunted by a capacitance element, said parallel resonant circuit being relatively sharply tuned to an intermediate frequency in the immediate vicinity of said accompanying sound carrier, and means including a predetermined portion of said inductance element for connecting the junction between said series connected bifilar windings to a point of signal reference potential.

6. Apparatus in accordance with claim 5 wherein said source is subject to provide in addition to the desired composite IF signal an undesired signal comprising an adjacent channel picture carrier at a frequency adjacent to the other edge of said IF band and wherein said signal transfer apparatus also includes an additional parallel resonant circuit comprising a second inductance element shunted by a second capacitance element, at least a portion of said second inductance element being included in series with said first-named inductance element portion in the connection between said junction and said point of signal reference potential, said additional parallel resonant circuit being relatively sharply tuned to a frequency in the immediate vicinity of said adjacent channel picture carrier.

References Cited in the file of this patent

UNITED STATES PATENTS

| | | |
|---|---|---|
| 1,759,952 | McCurdy | May 27, 1930 |
| 1,890,543 | Holden | Dec. 13, 1932 |
| 2,085,952 | Cauer et al. | July 6, 1937 |
| 2,204,702 | Rust | June 18, 1940 |
| 2,619,536 | Cotsworth et al. | Nov. 25, 1952 |
| 2,707,730 | Torre | May 3, 1955 |
| 2,733,414 | Lansil | Jan. 31, 1956 |
| 2,752,575 | Maclary | June 26, 1956 |

FOREIGN PATENTS

| | | |
|---|---|---|
| 710,535 | France | June 8, 1931 |